Aug. 28, 1951  F. H. SWEET  2,566,258
SPINDLE BRAKE
Filed Nov. 4, 1949
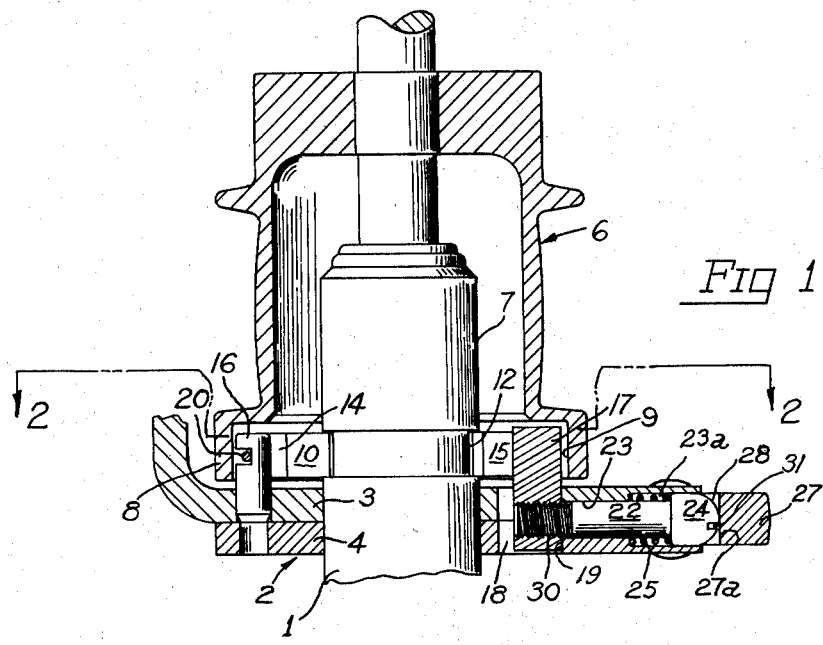
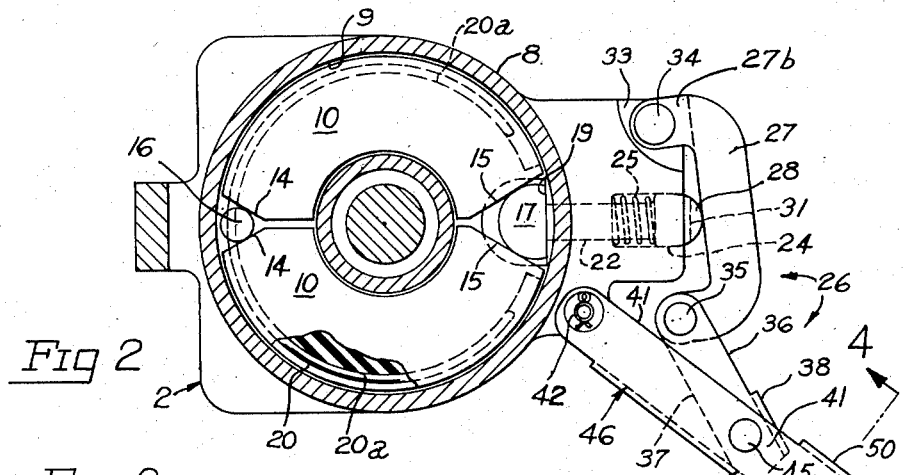
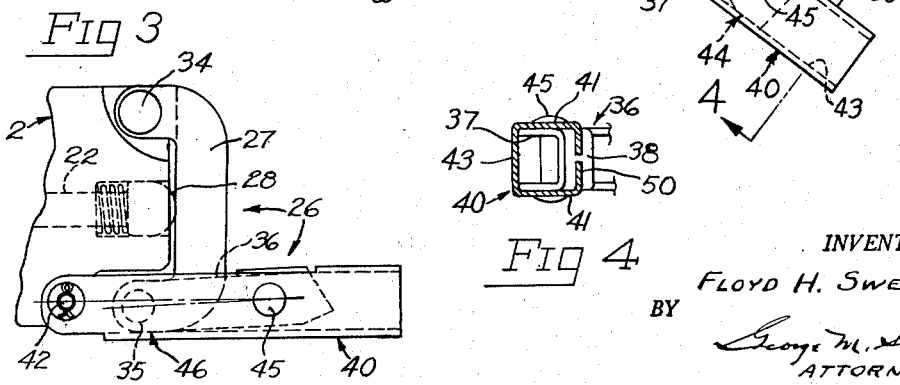
INVENTOR.
FLOYD H. SWEET
BY
*George M. Louis*
ATTORNEY Patented Aug. 28, 1951

2,566,258

UNITED STATES PATENT OFFICE 2,566,258

SPINDLE BRAKE

Floyd H. Sweet, Euclid, Ohio, assignor to The Marquette Metal Products Company, Cleveland, Ohio, a corporation of Ohio Application November 4, 1949, Serial No. 125,456

4 Claims. (Cl. 57—88)

The invention relates to textile mill spindle brakes and specifically to an improved readily releasable toggle mechanism for effecting strong braking pressure when it is desired to stop the spindle from rotating and for enabling quick release of the braking force and reestablishment of the toggle mechanism in an idle or non-working position of its parts to release the spindle.

The above indicates the principal object of the invention. Others will be made apparent from the following description of the preferred illustrative form shown in the accompanying drawing, wherein:

Fig. 1 is vertical central sectional view of the brake and its operating or actuating means fitted to a typical spindle assembly shown mainly in elevation. Fig. 2 is plan view of the brake and actuating means—the spindle whorl against which the brake operates and the brake-supporting parts of the spindle assembly being shown in section as indicated by the line 2—2 of Fig. 1. Fig. 3 is a fragmentary plan view of the toggle lever portions of the brake actuating means in brake applying and locking position. Fig. 4 is a detail sectional view as indicated on Fig. 2.

As shown in Fig. 1, the bolster case 1 has a rigid flange 2 which may be made in two parts 3 and 4 secured together and to the bolster case as by brazing. The bolster case rotatably supports the live spindle blade 5 in suitable bearings not shown; and the whorl 6, rigid with the blade, loosely surrounds the upper end portion 7 of the bolster case concentric therewith. The lower flange 8 of the whorl has a circular inner surface 9 forming a brake drum.

The friction brake elements comprise a pair of identical arcuate shoe segments 10 made of high heat resistant semi-hard friction composition of somewhat yieldable nature, such being obtainable at the present time under the trade name "Texolite." As described in "Handbook of Chemistry and Physics" published by the Chemical Rubber Publishing Company, Cleveland, Ohio, 30th edition 1947, pages 1279, 1280 and 1287 the material "Texolite" is a fabric or paper base, laminated, thermosetting, phenol-formaldehyde resin (manufacturer General Electric Company, Schenectady, New York). The shoes or segments 10 lie closely around the upper portion 7 of the bolster case as shown in Fig. 2 out of contact therewith, the segments being supported for radial and limited horizontal floating movement in a circumferential groove or channel 12 of the case portion 7. Diametrally opposite, relatively diverging pairs of cam surfaces 14 and 15 of the segments are operated upon respectively by a fixed upright circular pin 16 supported by the bolster flange 2 (Fig. 1) and a movable pin or block 17 of semi-circular section loosely mounted in a slot 18 (Fig. 2) extending through said flange. Normally the flat vertical side of pin 17 rests against a flat side 19 of the slot 18, and in that position of pin 17 the circular braking surfaces of the shoes or segments 10 clear the drum surface 9 as illustrated in Fig. 2. A single C-shaped spring 20 embraces the brake shoe segments in peripheral coplanar channel slots 20a thereof to force the shoes toward each other against the actuating pins and release the brake to allow the spindle to turn freely. The brake elements 10 can be combined into a single resilient C-shaped piece and be effectually operated by the subject mechanism.

To apply braking force to the shoe elements 10 the movable pin or block 17 has a push-rod 22 adjustably secured thereto and slidably supported by a bore surface 23 in the flange 2. The push rod has an enlarged head 24 in a counterbore 23a of the flange and extending out of the counterbore beyond the adjacent limits of the flange. The head 24 is acted on by a coiled compression spring 25 in the counterbore 23a to move the push rod and its shoe-operating pin or block 17 outwardly away from the spindle.

Actuating toggle mechanism 26 for the brake, particularly actuating lever 27 thereof, acts through its flat edge surface 27a against the spherical end surface portion 28 of the head 24 to apply the brake.

For initial adjustment and to compensate for brake shoe surface wear the push rod 22 is fairly tightly threaded at 30 into the actuating pin or block 17 and an eccentric slot 31 in the head 24 enables convenient use of a screw driver to effect the necessary adjustment. The slot 31 may occupy any turned position without disturbing the spherical and flat surface contact between the push rod 22 and brake lever 27. Spring 25 acts as an adjustment retainer in conjunction with the fairly tightly fitting threads at 30.

The brake lever 27 for the sake of rigidity and compactness of the mechanism is a U-shaped rigid bar having a bifurcated end 27b to embrace a reduced thickness portion 33 of the bolster flange 2 where the lever is connected by a pivot pin 34. The opposite end of the lever 27 is pivotally connected by a pin 35 to a toggle link 36 formed as an openly folded sheet metal blank as clearly shown by Figs. 2 and 4 with sides or flanges 37 and a connecting web 38. The sides 37 of the link enter between similar spaced sides or flanges 41 of a manual operating arm 40 pivoted as by a readily removable pin 42 to the bolster flange. The toggle link is pivotally secured to the arm 40 by pin 45. The connecting wall or web 43 for the spaced sides of the arm 40 forms an abutment stop at 44 against a bevel end portion of link 36 when the brake is released by opening of the toggle mechanism as illustrated by Fig. 2. The head surface 28 of the push rod maintains slight pressure on the lever 27 when the abutment at 44 is established so that the mechanism 26 does not rattle in its brake releasing position.

To apply the brake arm 40 is moved to its Fig. 3 position wherein the toggle link 36 is slightly past dead center with reference to pivot pins 42 and 45. Movement beyond dead center is stopped by abutment of lever 27 and arm 40 at 46. The yield of the brake shoe elements 10 abutted by the actuating pin 17 enables movement of the toggle link 36 over the dead center position because the device is so designed that the brake shoe surfaces must be seated firmly against the whorl drum surface 9 before the dead center position of the toggle is reached. Thereby the set brake shoes, reacting against the fixed pin 16 and the whorl drum maintain the toggle in locked, "brake-on" position without imposing sufficient flexing strain on the metal parts to cause distortion thereof or excessive wear on the pivots.

The operating arm 40 extends outwardly from the usual guard rail of the machine only a sufficient distance to enable effective operation which is usually by the foot or knee of the operator or attendant. The outer end of the arm is preferably formed into a nearly closed tube at 50, Fig. 4, so that the extremity of the arm is rigid and generally smooth.

Adjustment of the effective length of the push rod 22 can be quickly accomplished by removing the pin 42 and swinging the mechanism 27 outwardly about the pivot pin 34 to fully expose the eccentrically slotted head 24 of the push rod.

I claim:

1. A textile spindle brake mechanism for a spindle assembly having a flanged bolster case and a blade including a whorl with an internal braking surface around the case above the flange thereof, said mechanism comprising expansible shoe means supported by the bolster case in juxtaposition with the braking surface, a longitudinally slidable push rod carried by the bolster case flange operatingly connected to the shoe means to apply braking pressure thereto a U-shaped lever having arms extending toward the spindle blade and a connecting bar portion overlying the outer end of the push rod, one arm being pivotally connected to the bolster flange, an operating arm pivoted to the flange, and a toggle link pivotally connected to the other arm of the U-shaped lever and to the operating arm so as to move past a dead center position with reference to the pivot of the operating arm and the pivotal connection of said arm to the link when the brake is applied.

2. A textile spindle brake comprising a blade whorl with a drum surface, a bolster assembly having means to support relatively movable brake shoe elements of yielding material in juxtaposition with said surface for engagement therewith, and a toggle operating means for the brake shoes arranged to be moved past a dead center position through yielding of the brake shoe material after the shoe elements are in braking contact with the drum surface.

3. A textile spindle brake comprising a rotary blade having a circular internal braking surface rigid therewith, a bolster assembly supporting the blade, brake shoe means of yieldable material including spaced apart relatively diverging shoe surfaces and an actuating pin engaging said surfaces to apply the brake, and a toggle mechanism having an element movable from an open to a closed dead-center position in which the brake is applied, said yieldable material of the brake shoe means in contact with the pin functioning as a spring to enable movement of the toggle past dead center position and to hold the toggle in closed position.

4. A spindle brake comprising brake shoe means acting frictionally against a circular drum surface of the whorl to stop the spindle, an actuator element for the brake shoe means, a longitudinally movable push rod having a threaded connection with said element for adjustment, actuating mechanism including a lever adapted to bear on a generally spherical end portion of the push rod to apply the brake, said spherical end portion having an eccentric slot parallel to the axis of the push rod to permit the latter to be turned as by a screw driver.

FLOYD H. SWEET.

No references cited.